(12) United States Patent
Öxle et al.

(10) Patent No.: US 8,022,653 B2
(45) Date of Patent: Sep. 20, 2011

(54) METHOD AND CIRCUIT ARRANGEMENT FOR THE ELECTRICAL CONTROL AND/OR REGULATION OF THE MOVEMENT OF AN ELECTRICALLY DRIVEN UNIT

(75) Inventors: Thomas Öxle, Markdorf (DE); Wolfgang Schulter, Meersburg (DE)

(73) Assignee: Conti Temic Microelectronic GmbH, Nuremberg (DE)

( * ) Notice: Subject to any disclaimer, the term of this patent is extended or adjusted under 35 U.S.C. 154(b) by 1 day.

(21) Appl. No.: 11/579,906

(22) PCT Filed: Apr. 21, 2005

(86) PCT No.: PCT/DE2005/000729
§ 371 (c)(1),
(2), (4) Date: Nov. 8, 2006

(87) PCT Pub. No.: WO2005/111747
PCT Pub. Date: Nov. 24, 2005

(65) Prior Publication Data
US 2007/0214722 A1    Sep. 20, 2007

(30) Foreign Application Priority Data

May 8, 2004   (DE) .................. 10 2004 022 805
Apr. 12, 2005  (DE) .................. 10 2005 016 893

(51) Int. Cl.
*H02P 7/00* (2006.01)
(52) U.S. Cl. ........ 318/460; 318/461; 318/465; 318/474; 318/476; 49/31; 49/43; 388/930; 388/921; 388/922; 701/49

(58) Field of Classification Search .................. 318/461, 318/445, 286, 369, 460, 465, 474, 476; 388/930, 388/921, 922; 49/31, 43; 701/49
See application file for complete search history.

(56) References Cited

U.S. PATENT DOCUMENTS
4,383,238 A * 5/1983 Endo ............................ 340/901
(Continued)

FOREIGN PATENT DOCUMENTS
DE     28 675     1/1961
(Continued)

OTHER PUBLICATIONS

Birk, Manfred, "Unkonventionelle Drehzahlmessung und—regelung bei Gleichstrominotoren", in Elektronik 25 / Dec. 14, 1984; Seite 71 und 72.

*Primary Examiner* — Rita Leykin

(57) ABSTRACT

Disclosed is a circuit arrangement for electrically controlling and/or regulating the movement of an electrically driven unit (2), especially a window lifter or sliding roof of a motor vehicle, and to a method for operating said circuit arrangement. According to the invention, a jamming protection System is characterized in that a correlation variable (K) for the adjusting force of the unit (2) is measured and the adjusting movement is stopped or reversed in order to prevent jamming if the correlation variable (K) for the adjusting force exceeds a threshold value that corresponding to a predetermined jamming force. A filter (140) is used for temporally filtering the correlation variable (K) for the adjusting force of the unit. The invention is characterized in that the filter parameters (142, 143), especially the cutoff frequency (fg) and/or the order of the filter (140), can be controlled.

23 Claims, 4 Drawing Sheets

U.S. PATENT DOCUMENTS

| | | | |
|---|---|---|---|
| 5,832,664 A * | 11/1998 | Tajima et al. | 49/26 |
| 5,949,207 A * | 9/1999 | Luebke et al. | 318/446 |
| 6,064,165 A * | 5/2000 | Boisvert et al. | 318/465 |
| 6,404,158 B1 * | 6/2002 | Boisvert et al. | 318/469 |
| 6,456,028 B2 | 9/2002 | Aoki et al. | |
| 6,548,979 B2 * | 4/2003 | Boisvert et al. | 318/469 |
| 6,559,616 B2 | 5/2003 | Aoki et al. | |
| 7,548,037 B2 * | 6/2009 | Boisvert et al. | 318/466 |
| 7,579,802 B2 * | 8/2009 | Boisvert et al. | 318/466 |
| 2002/0101210 A1 * | 8/2002 | Boisvert et al. | 318/469 |
| 2002/0121872 A1 * | 9/2002 | Boisvert et al. | 318/469 |
| 2004/0183493 A1 * | 9/2004 | Boisvert et al. | 318/469 |

FOREIGN PATENT DOCUMENTS

| | | |
|---|---|---|
| DE | 109 142 | 10/1974 |
| DE | 254 254 | 12/1986 |
| DE | 42 22 914 | 7/1992 |
| DE | 43 22 810 | 7/1993 |
| DE | 195 11 307 | 3/1995 |
| DE | 197 51 676 | 7/1999 |
| DE | 101 49 578 | 4/2003 |

* cited by examiner

METHOD AND CIRCUIT ARRANGEMENT FOR THE ELECTRICAL CONTROL AND/OR REGULATION OF THE MOVEMENT OF AN ELECTRICALLY DRIVEN UNIT

BACKGROUND OF THE INVENTION

The invention refers to a circuit arrangement for the electrical control and/or regulation of the movement of an electrically driven unit, e.g. of an electrically driven adjusting drive in a vehicle. The invention also refers to a method for the electrical control and/or regulation of the movement of an electrically driven unit. The method and the circuit arrangement particularly refer to the recognition of jamming situations with electrically driven adjusting drives in motor vehicles, such as window winders, sunroofs or seat adjustment devices.

There are various regulations and directives that refer to such adjusting drives, for example 74/60/EEC by the European Union, EC21 by the United Nations Economic Commission for Europe (UNECE), FMVSS118 by the National Highway Traffic Safety Administration of the USA etc. All these regulations require limiting the jamming force to a maximum of 100 Newton in the presence of certain operating and test conditions.

From DE 44 42 171 A1, a method is known in which, for the recognition of jamming situations, the performance parameters of the electric motor are continuously picked up at measuring instants that are equidistant in time, and the adjusting force is determined therefrom.

Usually, brush-commutated d.c. motors with two magnetic poles are used in adjusting drives of motor vehicles. Commutation results in so-called current ripples on the motor-current signal, wherein a ripple occurs with each commutation.

In addition, the voltage of the electrical supply system of a motor vehicle also comprises alternating components when certain operating conditions prevail. These alternating components of the motor voltage cause additional alternating components in the motor current.

According to the general state of the art, a continuous signal is low-pass-filtered prior to equidistant-in-time sampling, wherein the limit frequency of the low-pass filter is lower than half of the sampling frequency. According to well-known Shannon's sampling theorem, this is necessary in order to prevent so-called aliasing effects. Usually, the utilized motors comprise between 8 and 12 slots so that 10 current ripples per revolution occur in a 10-slot motor. Thus, an alternating-current signal with a frequency of 10 times the speed superposes on the motor-current signal. Depending on the load and the operating voltage, the speed of the rotor is typically between 10 and 80 revolutions per second. Thus, the alternating components in the motor current caused by commutation are within a frequency range of between 100 and 800 Hz.

Typically, the motor current variations caused by jamming situations are within a frequency range of less than 20 Hz.

Usually, the components caused by commutation are suppressed by means of a low-pass arrangement that also suppresses the higher-frequency components of the alternating components in the motor current caused by ripples in the electrical supply system of the vehicle. For example, it is necessary to select a limit frequency of the low-pass filter of significantly lower than 100 Hz in order to sufficiently damp current ripples at 100 Hz.

In a jamming situation, the adjusting force increases which causes an increase in motor current. As shown in FIG. 2, low-pass filtering causes a delayed increase in filtered current which in the end results in a delayed recognition of jamming situations and thus in increased jamming forces.

Since the alternating components are very big in the presence of certain operating conditions, a very high degree of suppression is usually selected within the frequency range of the disturbing alternating components. This is achieved either by using appropriately low limit frequencies or by using appropriately high filter orders. However, low limit frequencies and high filter orders disadvantageously increase delay times.

Thus, the object of the invention is to provide a method and a circuit arrangement that improve the recognition of jamming situations.

SUMMARY OF THE INVENTION

According to the invention, this object is achieved, regarding the circuit arrangement for the electrical controlling the movement of an electrically driven unit (2), such as a window winder or a sunroof of a motor vehicle, with a jamming protection system in which a correlation quantity (K) for the adjusting force of the unit (2) is measured and an adjusting movement is stopped or reversed in order to prevent jamming if the correlation quantity (K) for the adjusting force exceeds a limiting value ($f_g$) that corresponds to a predetermined jamming force, wherein a filter (140) is provided for filtering the correlation quantity (K) for the adjusting force of the unit (2), characterized in that the filter (140) is controllable by means of at least one accompanying filter parameter (142, 143). According to the invention, this object is achieved, regarding the method of operating an electrically driven unit with a circuit arrangement (SA, wherein a correlation quantity (K) for the adjusting force of the unit (2) is determined and an adjusting movement of the unit (2) is stopped or reversed in order to prevent jamming if the correlation quantity (K) for the adjusting force exceeds a limiting value that corresponds to a predetermined jamming force, and wherein the correlation quantity (K) is filtered, characterized in that the correlation quantity (K) is filtered by means of a controllable filter parameter (142, 143), such as by means of the limit frequency ($f_g$) of the filter (140) and/or by means of an order of the filter (140).

The invention proposes a circuit arrangement for the electrical control and/or regulation of the movement of an electrically driven unit, in particular of a window winder or a sunroof of a motor vehicle, with a jamming protection system in which a correlation quantity for the adjusting force of the unit is measured and an adjusting movement of the unit is stopped or reversed in order to prevent jamming if the correlation quantity for the adjusting force exceeds a limiting value that corresponds to a predetermined jamming force, wherein a filter is provided for filtering the correlation quantity for the adjusting force of the unit, said filter, for temporarily filtering the correlation quantity, being controllable by means of at least one filter parameter. The control of the filter by means of one or more filter parameters enables the correlation quantity to be filtered temporarily, wherein the controllable filter may be activated or deactivated by means of a signal.

In a preferred embodiment of the circuit arrangement, the limit frequency and/or an order of the filter are controllable filter parameters. In this way, the damping of the filter can be improved depending on the operating and measurement conditions and on the specific situation, and the response time for recognizing jamming situations can be reduced in the presence of appropriate operating and measurement conditions. The order of a filter defines the decrease in amplification of frequencies above or below the respective limit frequency of the filter. For example, it is n*20 dB per frequency decade, wherein n is the order of the filter. Filters of higher orders may be created genuinely or by connecting low-order filters (1$^{st}$ and 2$^{nd}$ order) in series.

In a further embodiment, an alternating-signal component of the measured correlation quantity and/or of another parameter proportional thereto is determined, and the filter parameter is controllable depending on this alternating-signal component. For this purpose, a filter arrangement for determining an alternating-signal component of the correlation quantity, in particular of the motor-current signal and/or the motor-voltage signal and/or the signal of the voltage of the electrical supply system of the vehicle, is suitably provided.

The filter arrangement advantageously comprises an alternating-signal filter, in particular an alternating-current filter and/or an alternating-voltage filter, for filtering the accompanying alternating-signal component. In particular, an alternating-current signal filter is configured as a high-pass arrangement or a band-pass arrangement.

The filter arrangement may also comprise a further filter, in particular a current filter, e.g. a low-pass filter and/or a band-pass filter.

The output signal of the alternating-signal filter is then supplied to an intensity-measuring device whose output signal is supplied to an arithmetic unit, in particular to a processing unit. A speed signal of the rotor is supplied to the processing unit in order to compare the quantity of the output signal of the alternating-signal filter with further quantities. In addition, a signal characterizing the intensity of the ripples in the electrical supply system of the vehicle may be supplied to the processing unit.

In other words: The filter parameter may be adjusted depending on the quantity characterizing the intensity of the alternating-current component and/or on the quantity characterizing the intensity of the ripples in the electrical supply system of the vehicle and/or on the quantity characterizing the speed of the rotor, wherein the filter parameter is adjusted in such a way that the phase delay for low-frequency signal components of the motor-current signal is as short as possible and disturbing alternating components of the motor-current signal are damped to such an extent that they will not disturb the subsequent determining of the adjusting force. In this way, lower jamming forces are achievable, in particular at high adjusting speeds and also in situations where very hard objects are jammed.

Preferably, the speed of the vehicle is used for generating a quantity characterizing the intensity of the ripples in the electrical supply system of the vehicle. Alternatively or in addition, the state of the ignition system of the motor vehicle and/or the presence of the ignition key in the ignition lock, the state of the drive engine of the motor vehicle and/or the speed signal of the drive engine of the motor vehicle may be used for generating a quantity characterizing the intensity of the ripples in the electrical supply system of the vehicle.

BRIEF DESCRIPTION OF THE DRAWINGS

In the following, the invention will be described in greater detail on the basis of exemplary embodiments and figures. The figures show.

DETAILED DESCRIPTION OF THE DRAWINGS

Figure 1:
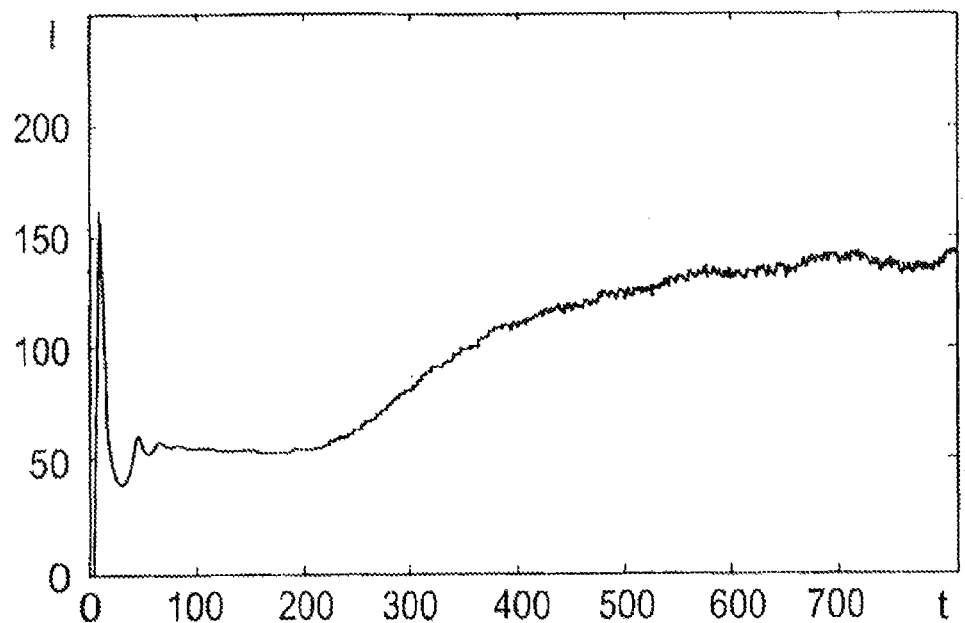
FIG. 1 Time history of a motor-current signal, wherein the motor load is low
  i. at the beginning of the recording.

The same reference numerals will be used throughout the figures to refer to similar parts.

FIG. 1 shows a time history of a motor-current signal I of a unit, e.g. of an adjusting motor for a window winder or for a sunroof, at low load. The motor load is low at the beginning of the recording. The load continuously increases during the recording. As can be seen, the intensity of the current ripples increases with increasing load.

Figure 2:
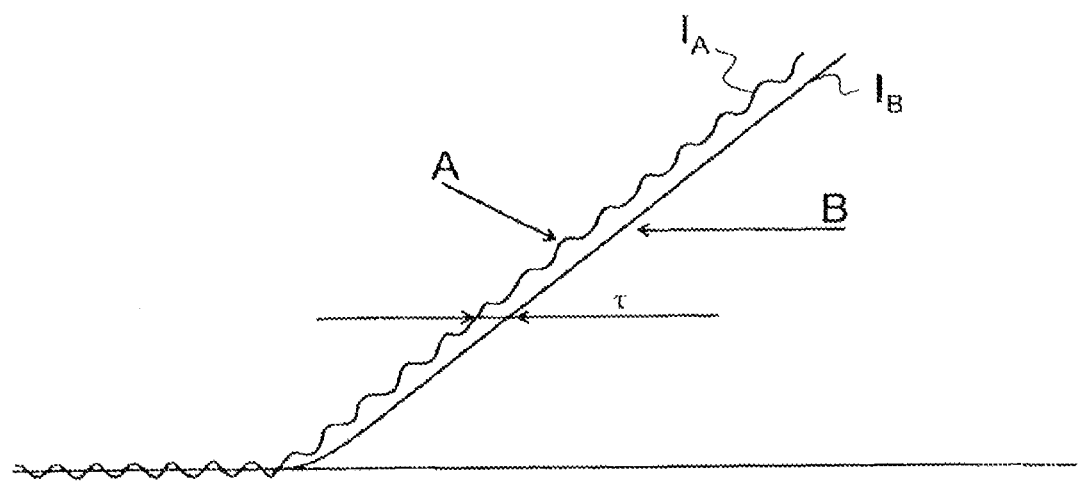
FIG. 2 Time history of the motor-current signal in a jamming situation (signal A)
  i. as well as the time history of the motor-current signal filtered with a first-
  ii. order low-pass filter (signal B) in a jamming situation.

FIG. 2 shows a time history of the motor-current signal $I_A$ in a jamming situation (signal A) as well as the time history of the motor-current signal $I_B$ filtered with a first-order low-pass filter (signal B) in a jamming situation. The time-delayed rise (caused by the filtering process) of the filtered motor-current signal $I_B$ is apparent.

The first-order filter is defined by transfer function H:

$$H(f) = \frac{k}{1 + j\frac{f}{fg}} \quad [1]$$

where k is the factor of proportionality and $f_g$ is the limit frequency.

The indicated delay time τ can be calculated by the following formula:

$$\tau = \frac{1}{2 * \pi * fg} \quad [2]$$

Figure 3:
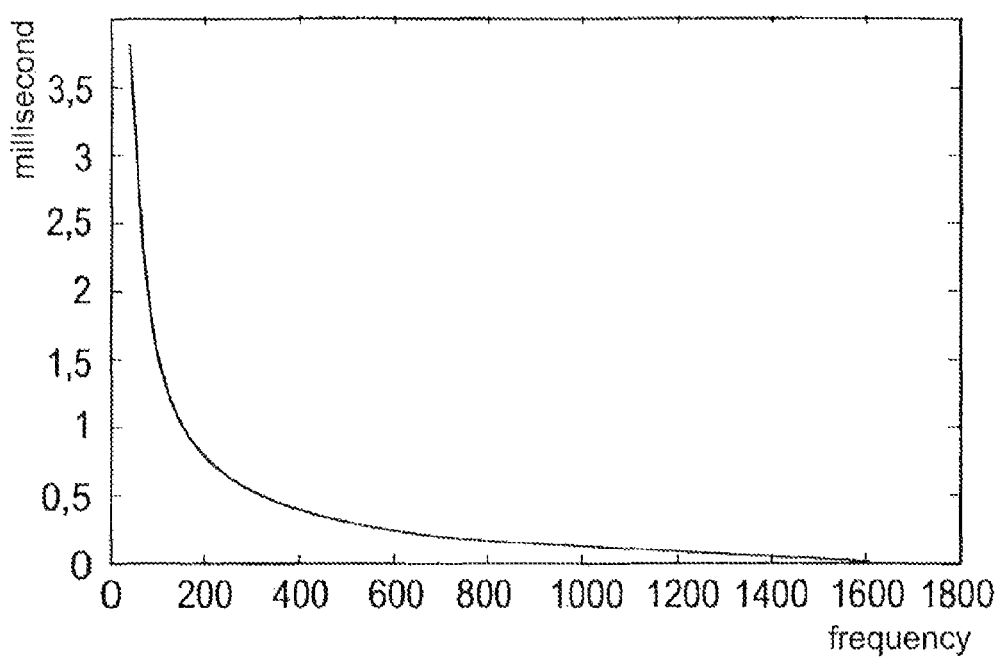
FIG. 3 Course of the delay time depending on the change of the limit
  i. frequency of the filter.

FIG. 3 shows a course of the delay time τ depending on the change of the limit frequency $f_g$ of the filter, wherein the limit frequency $f_g$ of the filter configured as a low-pass filter was varied and the delay time τ was recorded. The diagram shows that the increase in limit frequency $f_g$ results in a decrease in delay time τ and thus in a decrease in phase delay.

Figure 4:
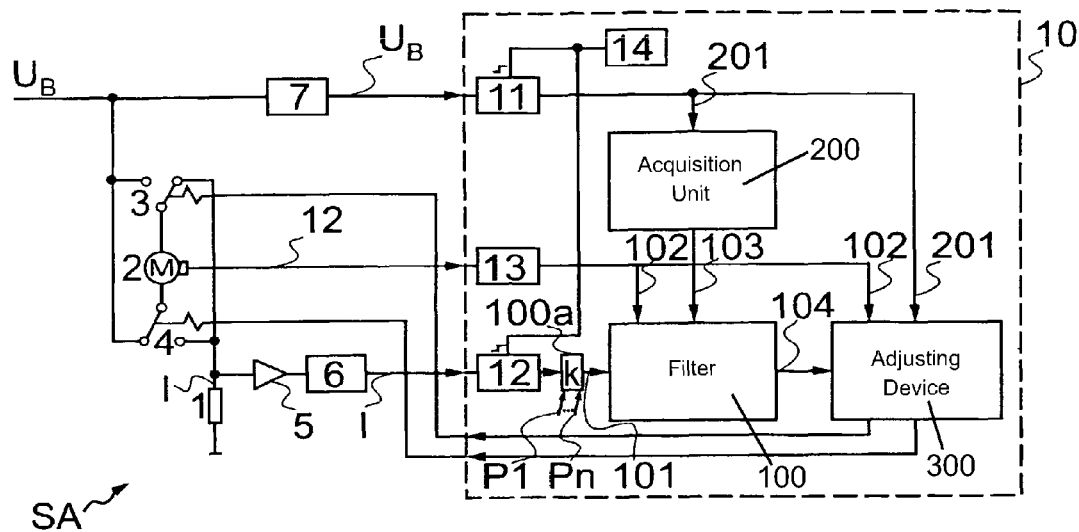
FIG. 4 Schematic representation of a circuit arrangement for the control and/or
  i. regulation of the unit, e.g. of an adjusting motor.

FIG. 4 is a schematic representation of a circuit arrangement SA for the control and/or regulation of a unit 2, e.g. of a drive motor or an adjusting motor M. The drive control system shown as a block diagram also comprises an acquisition unit 1 for picking up the motor-current signal I, in particular a resistor for picking up the motor-current signal I of unit 2. Two relays 3 and 4 are provided for driving the motor of unit 2.

An amplifier 5, in particular a signal amplifier for amplifying the input signal (i.e. motor current I) is provided for taking into consideration the correlation quantity K when determining the adjusting force of unit 2. A low-pass filter 6 is connected downstream the amplifier 5 in order to avoid aliasing effects during subsequent sampling of the motor-current signal I.

The circuit arrangement SA picks up, in addition to motor current I, the voltage $U_B$ of the electrical supply system of the vehicle. A low-pass filter 7 is provided for avoiding aliasing effects during the subsequent sampling of the voltage $U_B$ of the electrical supply system of the vehicle.

Afterwards, the voltage $U_B$ of the electrical supply system of the vehicle and the motor-current signal I are supplied to a drive control system 10 of the circuit arrangement SA for the control and/or regulation of unit 2. In addition or alternatively, the speed n of unit 2 may be picked up and supplied to the drive control system 10.

For sampling the signals picked up, i.e. the voltage $U_B$ of the electrical supply system of the vehicle and/or the motor current I, the drive control system 10 comprises a sampling element 11 and a sampling element 12, respectively. Moreover, a clock generator 14 connected to the sampling elements 11 and 12 is provided for generating sampling clock pulses. The drive control system 10 comprises an acquisition unit 13 for picking up the speed n of unit 2.

For determining the adjusting force of unit 2, the drive control system 10 comprises, on the one hand, a filter arrangement 100 and an adjusting device 300 connected downstream the filter arrangement 100 for recognizing a jamming situation, in particular for determining the adjusting force and controlling the unit 2 accordingly. On the other hand, for determining the alternating-signal components of the voltage $U_B$ of the electrical supply system of the vehicle, the sampling element 11 is connected to a further acquisition unit 200 for determining the ripples in the voltage of the electrical supply system of the vehicle, wherein the filter arrangement 100 serves to filter the correlation quantity K, in particular the motor-current signal I, and thus to filter the current in order to suppress alternating-signal components caused by commutation and by disturbances in the electrical supply system of the vehicle. The filter arrangement 100 is connected between the acquisition units 1, 13 and/or 200 and the adjusting device 300.

Depending on the type and the configuration of the drive control system 10, a further module 100a for forming and determining the correlation quantity K may be connected preceding the filter arrangement 100. For example, the correlation quantity K may also be determined on the basis of at least one of the following parameters or on the basis of several parameters P1 to Pn. As parameters P1 to Pn serve, for example, the voltage $U_B$ of the electrical supply system of the vehicle, the electrical resistance and/or the inductance of unit 2, the temperature and/or a machine constant of unit 2, the magnetic flux and/or a characteristic of unit 2. A correlation quantity K determined in such an indirect way is supplied as an unfiltered correlation quantity 101 to the filter arrangement 100.

During the operation of the drive control system 10, the voltage $U_B$ of the electrical supply system of the vehicle is supplied as a sampled signal 201 of the voltage of the electrical supply system of the vehicle to the acquisition unit 200 for determining the ripples in the voltage of the electrical supply system of the vehicle and to the adjusting device 300.

On the basis of the signal 201 of the voltage of the electrical supply system of the vehicle and/or further operating signals (e.g. the state of the ignition system, the state of the vehicle drive engine, the speed of the vehicle drive engine and/or the travelling speed), the acquisition unit 200 determines a signal 103 characterizing the intensity of the alternating-voltage components. The signal 103 is supplied to the filter arrangement 100.

A quantity 102 characterizing the speed n of the rotor or of unit 2 is also supplied to the filter arrangement 100. On the basis of the quantity 102 characterizing the speed n and of the signal 103 characterizing the intensity of the alternating-voltage components as well as on the basis of the sampled motor-current signal I and the unfiltered correlation quantity 101 resulting therefrom, a control signal 104 is determined by means of the filter arrangement 100. The control signal 104 is supplied to the adjusting device 300 for recognizing a jamming situation of unit 2. Thus, the filter arrangement 100 is controllable, i.e. the limit frequency and/or the order of the filter arrangement 100 are determined depending on the signals 101, 102 and/or 103 supplied to the filter arrangement 100.

Figure 5:
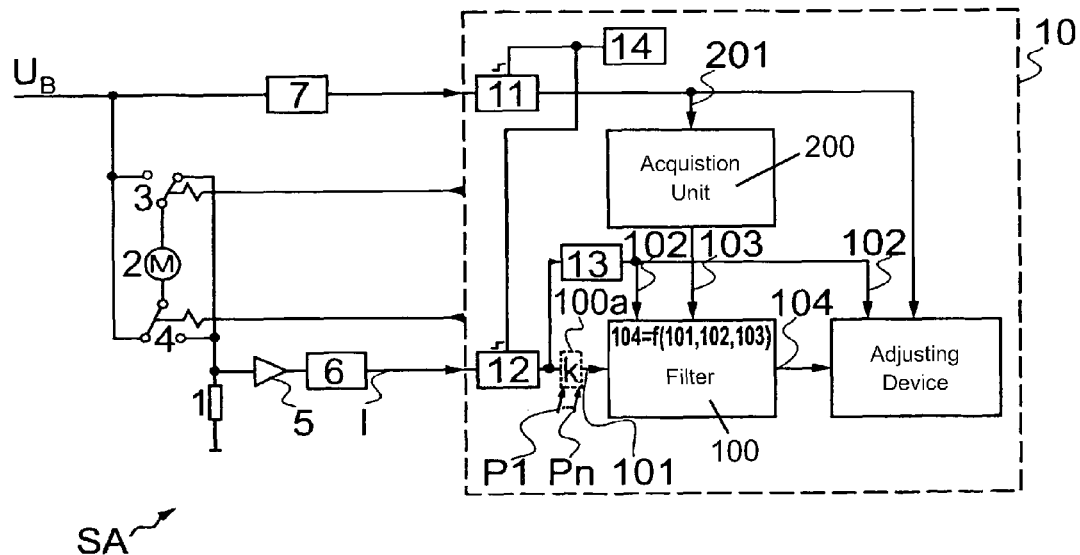
FIG. 5 Schematic representation of an alternative embodiment for a circuit
  i. arrangement for the control and/or regulation of a unit with a rotor speed determined from the current ripples.

FIG. 5 shows an alternative embodiment for a circuit arrangement SA for the control and/or regulation of a unit 2 with a rotor speed n determined from the current ripples, wherein the speed n of unit 2 is determined from the current ripples of the motor-current signal I by means of the acquisition unit 13. For this purpose, the input of the acquisition unit 13 is connected to the output of the sampling element 12 for the sampled motor-current signal 101.

Figure 6:
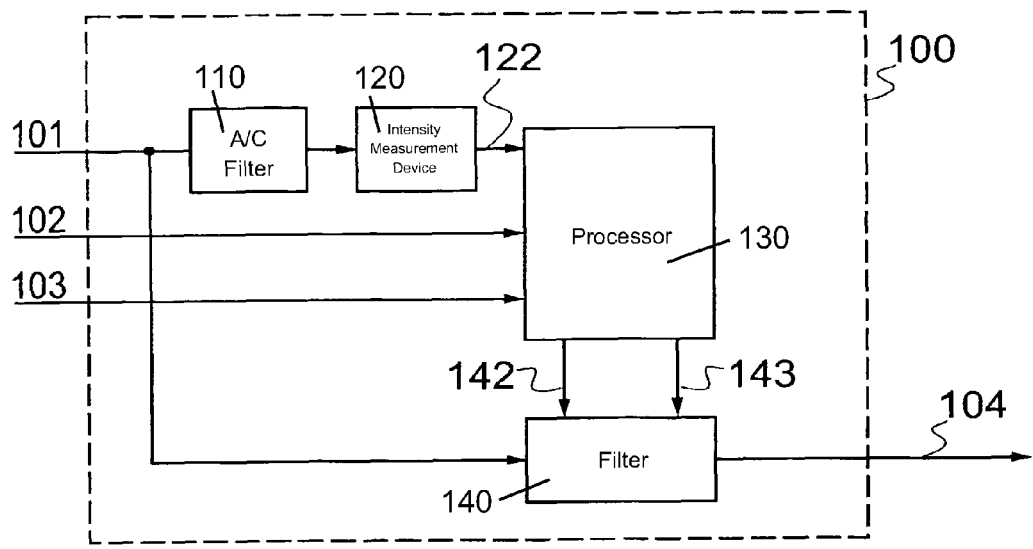
FIG. 6 Detailed schematic representation of the filtering of the current of the
  i. circuit arrangement according to FIG. 4 and FIG. 5, respectively;
  ii.

FIG. 6 is a detailed representation of the filter arrangement 100 for filtering the unfiltered correlation quantity 101. For example, the motor-current signal I, in particular the sampled motor-current signal I or a correlation quantity K determined on the basis of the parameters P1 to Pn (e.g. the voltage $U_B$ of the electrical supply system of the vehicle, the electrical resistance, the inductance and/or the temperature and/or other parameters of the unit), is supplied as an unfiltered correlation quantity 101 to the filter arrangement 100. In addition, a signal 102 characterizing the speed n of the rotor or of unit 2 and/or the signal 103 characterizing the intensity of the alternating-voltage components of the voltage $U_B$ of the electrical supply system of the vehicle is/are supplied to the filter arrangement 100.

For example, the sampled motor-current signal 101 is directly used as the correlation quantity K. For this purpose, the sampled motor-current signal 101 is supplied to an alternating-current filter 110 for filtering and determining the alternating-signal components, in particular the alternating-current components of the sampled motor-current signal 101. For example, the alternating-current filter 110 is a high-pass or a band-pass filter. An intensity-measuring device 120 for determining the intensity of the alternating-current components is connected downstream the alternating-current filter 110. For example, the amplitude, e.g. the maximum value of a certain number of input values, or a function, e.g. the mean power or the amplitude mean value of a certain number of input values, is determined for determining the intensity of the alternating-current components. On the output side, a quantity characterizing the intensity of the alternating-current components is supplied to a processing unit 130, in particular to an arithmetic unit, e.g. to a threshold comparator.

For taking into consideration further parameters when determining a jamming situation, the signal 102 representing the speed n and the signal 103 representing the intensity of the ripples in the voltage of the electrical supply system of the vehicle are supplied to the processing unit 130.

By means of the processing unit 130, these signals are processed to form at least one output signal 142, 143 that determines the limit frequency $f_g$ or the order of a downstream-connected filter 140, in particular of a current filter for filtering the correlation quantity K, in particular the motor-current signal I. For example, the limit frequency $f_g$ or the order of the filter 140 is set to a predetermined value in one exemplary embodiment. In a further exemplary embodiment, the limit frequency $f_g$ is set to a value that corresponds to the signal 102 characterizing the speed n of the rotor.

The correlation quantity K filtered by means of the filter 140 is then supplied to the adjusting device 300 as the signal 104. The filter 140 is configured as a low-pass filter or a band-pass filter.

Figure 7:
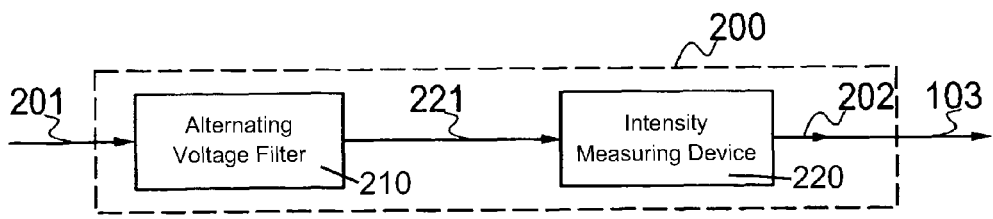
FIG. 7 Detailed schematic representation of the determining of the ripples in
  i. the electrical supply system of the vehicle of the circuit arrangement according to FIG. 4 and FIG. 5, respectively.

FIG. 7 illustrates an embodiment for the acquisition unit 200 for determining the ripples in the voltage of the electrical supply system of the vehicle. The acquisition unit 200 comprises an alternating-voltage filter 210 and an intensity-measuring device 220. It should be pointed out that this embodiment of the acquisition unit 200 is only one of the various possibilities disclosed in the patent of generating a signal 202 characterizing the intensity of the alternating components of the voltage $U_B$ of the electrical supply system of the vehicle which signal is supplied to the filter arrangement 100 as the signal 103.

The operation of the circuit arrangements SA will now be explained in greater detail, said circuit arrangements SA being described in FIG. 4 and FIG. 5, respectively, together with FIGS. 6 and 7.

Determining the Disturbances in the Motor Current:

In a first exemplary embodiment, the disturbances on the motor-current signal I are determined as follows: By means of an alternating-current filter 110, the disturbing alternating components are extracted from the measured motor-current signal 101, and a signal 122 characterizing the intensity of the alternating components is generated from these alternating components by means of an intensity-measuring device 120. For example, this intensity-measuring device may be configured as an amplitude detector that outputs the maximum value of a certain number of measured values. It is also possible to use a wattmeter that outputs the mean power of a certain number of measured values. A further realization provides the delay of the motor-current signal 101 used for the calculation for a certain number of sampling intervals in order to prevent a disadvantageous adaptation of the filter characteristic in a jamming situation.

Tests have shown that the amplitude of the alternating component of the motor-current signal 101 caused by the commutation by the brushes in the motor M depends on the amplitude of the d. c. component and on the speed: the bigger the amplitude of the d. c. component and the smaller the speed of the rotor, the bigger the amplitude of the alternating component of the motor-current signal 101.

In a further exemplary embodiment, the signal 122 characterizing the intensity of the alternating components is thus generated by multiplying the amplitude of the d. c. component by a factor of proportionality k.

In a further exemplary embodiment, the signal 122 characterizing the intensity of the alternating components is generated by dividing a predetermined value by the quantity 102 characterizing the speed of the rotor. The advantage of the two latter exemplary embodiments is that no alternating-current filter 110 and no wattmeter 120 have to be used which makes cheaper realization possible.

Determining the Disturbances in the Electrical Supply System of the Vehicle:

In a further exemplary embodiment, the disturbances in the electrical supply system of the vehicle are determined as follows: By means of an alternating-voltage filter 210, the disturbing alternating components are extracted from the measured signal 201 of the voltage of the electrical supply system of the vehicle, and a signal 103 characterizing the intensity of the alternating-voltage components is generated from these alternating components by means of an intensity-measuring device 220. For example, this intensity-measuring device 220 may be configured as an amplitude detector that outputs the maximum value of a certain number of measured values. It is also possible to use a wattmeter that outputs the mean power of a certain number of measured values. In a special realization of the exemplary embodiment, the signal 201 of the voltage of the electrical supply system of the vehicle used for this calculation is delayed for a certain number of sampling intervals.

When the ignition system of a motor vehicle is switched off, only very few electric systems are active. Additional electric systems are activated by switching the ignition system on. Further electric systems, e.g. electrically driven power steering, are activated when the engine is running. All of these electric systems may cause variations in the voltage of the electrical supply system of the vehicle. During the travel of the motor vehicle, additional variations in the voltage of the electrical supply system of the vehicle may be caused by systems such as electric running-gear control systems. The possible occurrence of variations in the electrical supply system of the vehicle may thus be inferred from the state of the ignition system and/or the state of the drive engine M and/or the speed of the vehicle. The advantage of the generation of a signal 103 characterizing the intensity of the alternating-voltage components depending on the state of the ignition system and/or the state of the drive engine M and/or the speed of the vehicle and/or the speed of the drive engine M is that no alternating-voltage filter 210 and no intensity-measuring device 220 have to be used which makes cheaper realization possible.

In a further exemplary embodiment, the signal 103 characterizing the intensity of the alternating-voltage components is thus influenced by the state of the ignition system. In the state "ON" of the ignition system, the signal 103 characterizing the intensity of the alternating-voltage components is increased by a predetermined value Z.

In a further exemplary embodiment, the signal 103 characterizing the intensity of the alternating-voltage components is influenced by the state of the drive engine M of the motor vehicle. In the state "Engine is running", the signal 103 characterizing the intensity of the alternating-voltage components is increased by a predetermined value m.

In a further exemplary embodiment, the signal 103 characterizing the intensity of the alternating-voltage components is influenced by the vehicle speed of the motor vehicle. If the vehicle speed is above a certain threshold, the signal 103 characterizing the intensity of the alternating-voltage components is increased by a predetermined value g.

In a further exemplary embodiment, the signal 103 characterizing the intensity of the alternating-voltage components is calculated by multiplying the vehicle speed by a factor of proportionality.

Determining the Quantity Characterizing the Speed of the Rotor:

It should be pointed out that it is within the scope of the invention to determine the speed n of the rotor from the current ripples caused by commutation (see DE 197 29 238).

In another exemplary embodiment, the speed n of the rotor is picked up by means of sensors that output a pulse sequence whose period correlates with the speed n. For example, such a sensor may be a Hall sensor that detects the magnetic flux of a magnetic-pole wheel arranged on the rotor axle.

Calculating the Limit Frequency:

The signal 122 characterizing the intensity of the alternating-current components, the signal 103 characterizing the intensity of the alternating-voltage components and/or the signal 102 characterizing the speed n of the rotor are supplied to the processing unit 130.

In the processing or arithmetic unit 130, the output signal 142 or 143 determining the limit frequency $f_g$ of the current filter 140 is calculated from the signal 122 characterizing the intensity of the alternating-current components and/or from the signal 103 characterizing the intensity of the alternating-voltage components and/or from the signal 102 characterizing the speed n of the rotor.

In one exemplary embodiment, the limit frequency $f_g$ of the current filter 140 is set to a predetermined value. In a further exemplary embodiment, the limit frequency $f_g$ of the current filter 140 is set to a value that corresponds to the signal 102 characterizing the speed n of the rotor, whereby the components caused by commutation are suppressed. The decisive advantage of this embodiment is that the phase delay by the current filter 140 at higher speeds n and thus at higher adjusting speeds is smaller than at lower speeds n. At higher adjusting speeds, delays cause a higher jamming force than at lower adjusting speeds.

In a further exemplary embodiment, the limit frequency $f_g$ is calculated by multiplying the signal 102 characterizing the speed n of the rotor or a predetermined value by a coefficient of correction. This coefficient of correction is calculated by one of the following formulas:

Coefficient of correction=predetermined value/signal 122 characterizing the intensity of the alternating-current components, or Coefficient of correction=predetermined value/signal 103 characterizing the intensity of the alternating-voltage components.

In this way, a further reduction of the phase delay and thereby a further reduction of the jamming forces can be achieved when the alternating components in the motor-current signal I and in the voltage $U_B$ of the electrical supply system of the vehicle are small.

Usually, a filter arrangement 140 with one or several filters of a very low filter order is used. By increasing the limit frequency $f_g$, the alternating-current components are damped to a smaller extent, but they are damped to such an extent that they will not disturb the determining of the adjusting force. The decisive advantage of the increase in the limit frequency $f_g$ is that the phase delay of the low-pass filter is reduced so that jamming forces can be recognized sooner and smaller jamming forces can be achieved.

Calculating the Filter Order:

Moreover, in the processing or arithmetic unit 130, the output signal 143 determining the filter order of the current filter 140 is calculated from the signal 122 characterizing the intensity of the alternating-current components and/or from the signal 103 characterizing the intensity of the alternating-voltage components and/or from the signal 102 characterizing the speed n of the rotor.

In one exemplary embodiment, the order of the current filter 140 is set to a predetermined value (e.g. 1). In a further exemplary embodiment, the order of the current filter 140 is calculated by multiplying a predetermined value by the signal 122 characterizing the intensity of the alternating-current components.

In a further exemplary embodiment, the order of the current filter 140 is calculated by multiplying a predetermined value by the signal 103 characterizing the intensity of the alternating-voltage components.

In a further exemplary embodiment, the order of the current filter 140 is calculated by multiplying a predetermined value by the signal 102 characterizing the speed n of the rotor.

In a further exemplary embodiment, the order of the current filter 140 is calculated by dividing a predetermined value by the signal 102 characterizing the speed of the rotor.

Configuration of the Current Filter 140:

In one exemplary embodiment, the current filter 140 is configured as a recursive digital filter with the following transfer function:

$$H(z) = \frac{Y(z)}{X(z)} = \frac{\sum_{\mu=0}^{m} b_\mu * z^{-\mu}}{\sum_{\nu=0}^{n} a_\nu * z^{-\nu}} \quad [3]$$

In this case, the filter characteristic and limit frequency $f_g$ is adjusted by means of the coefficients $a_\nu$ and $b_\mu$. The filter order is fixed by means of n and m.

The coefficients $a_\nu$ and $b_\mu$ may be calculated from the limit frequency $f_g$ to be adjusted and the predetermined filter order, or they may be adjusted using tables.

In a further exemplary embodiment, the current filter 140 is configured as a non-recursive digital filter with the following transfer function:

$$H(z) \sum_{\mu=0}^{m} b_\mu * z^{-\mu} \quad [4]$$

In this case, the filter characteristic and limit frequency $f_g$ is adjusted by means of the coefficients $b_\mu$. The filter order is fixed by means of m.

The coefficients $b_\mu$ may be calculated from the limit frequency $f_g$ to be adjusted and the predetermined filter order, or they may be adjusted using tables.

The invention claimed is:

1. A circuit arrangement (SA) for controlling movement of an electrically driven unit (2), such as a window winder or a sunroof of a motor vehicle, the arrangement comprising:
   a jamming protection system in which a correlation quantity (K) for an adjusting force of the unit (2) is measured and an adjusting movement is stopped or reversed in order to prevent jamming if the correlation quantity (K) for the adjusting force exceeds a limiting value (fg) that corresponds to a predetermined jamming force;
   a filter (140) is provided for filtering the correlation quantity (K) for the adjusting force of the unit (2), characterized in that the filter (140) is controllable by means of at least one accompanying filter parameter (142, 143), wherein an alternating-signal component of the measured correlation quantity (K) or of another parameter proportional thereto is determined, and the filter parameter (142, 143) is controllable depending on this alternating-signal component.

2. A circuit arrangement according to claim 1, wherein at least one of an accompanying limit frequency (fg) and an order of the filter (140) are used as filter parameters (142, 143).

3. A circuit arrangement according to claim 1, including a filter arrangement (100) for determining an alternating-signal component of the correlation quantity (K), of the motor-current signal (I).

4. A circuit arrangement according to claim 3, wherein the filter arrangement (100) comprises an alternating-signal filter (110) for filtering the alternating-signal component.

5. A circuit arrangement according to claim 4, wherein the alternating-signal filter (110), is an alternating-current signal filter that is configured as a high-pass arrangement.

6. A circuit arrangement according to claim 4, wherein the alternating-signal filter (110) is configured as a band-pass arrangement.

7. A circuit arrangement according to claim 4, wherein the filter arrangement (100) comprises a current filter (140).

8. A circuit arrangement according to claim 4, wherein the output signal of the alternating-signal filter (110) is supplied to an intensity-measuring device (120).

9. A circuit arrangement according to claim 8, wherein the output signal of the intensity-measuring device (120) is supplied to a processing unit (130).

10. A circuit arrangement according to claim 9, wherein a speed signal (n, 102) of the rotor is supplied to the processing unit (130).

11. A circuit arrangement according to claim 10, wherein a signal (103) characterizing the intensity of the ripples in the electrical supply system of the vehicle is supplied to the processing unit (130).

12. A method for operating an electrically driven unit with a circuit arrangement (SA) having a jamming protection unit and a filter, the method comprising:
    determining a correlation quantity (K) for the adjusting force of the unit (2);
    stopping or reversing an adjusting movement of the unit (2) in order to prevent jamming if the correlation quantity (K) for the adjusting force exceeds a limiting value that corresponds to a predetermined jamming force; and
    filtering the correlation quantity (K), wherein the correlation quantity (K) is filtered by means of a controllable filter parameter (142, 143), wherein an alternating-signal component of the measured correlation quantity (K) or of another parameter proportional thereto is determined, and the filter parameter (142, 143) is controllable depending on the alternating-signal component.

13. A method according to claim 12, wherein the filter parameter (142, 143) is adjusted depending on at least one of a quantity (122) characterizing the intensity of the alternating-current component and/or on the quantity (103) characterizing the intensity of the ripples in the electrical supply system of the vehicle and on the quantity (102) characterizing the speed (n) of the rotor.

14. A method according to claim 12, wherein the filter parameter (142, 143) is adjusted in such a way that the phase delay for low-frequency signal components of the motor-current signal (101) is as short as possible and disturbing alternating components of the motor-current signal (101) are damped to such an extent that they will not disturb the subsequent determining of the adjusting force.

15. A method according to claim 12, wherein the amplitude or the power of the output signal of the alternating-signal filter (110) is used for determining the quantity (122) characterizing the intensity of the alternating-current component.

16. A method according to claim 12, wherein the quantity (102) characterizing the speed (n) of the rotor and/or the amplitude of the motor-current signal (101) is used for determining the quantity (122) characterizing the intensity of the alternating-signal component.

17. A method according to claim 12, wherein the amplitude or the power of the output signal of an alternating-voltage filter (210) is used for determining the quantity (103) characterizing the intensity of the ripples in the electrical supply system of the vehicle.

18. A method according to claim 12, wherein the speed of the vehicle is used for generating a quantity (103) characterizing the intensity of the ripples in the electrical supply system of the vehicle.

19. A method according to claim 12, wherein a state of an ignition system of the motor vehicle or the presence of the ignition key in the ignition lock are/is used for generating a quantity (103) characterizing the intensity of the ripples in the electrical supply system of the vehicle.

20. A method according to claim 12, wherein a state of the drive engine (M) of the motor vehicle and/or the speed signal (n) of the drive engine (M) of the motor vehicle are/is used for generating a quantity (103) characterizing the intensity of the ripples in the electrical supply system of the vehicle.

21. A method according to claim 12, wherein a quantity (102) characterizing the speed (n) of the rotor is determined by determining the frequency of the alternating components that are included in the motor-current signal (101).

22. A method according to claim 12, wherein a maximum value of a certain number of input values is determined for determining an amplitude.

23. A method according to claim 12, wherein a mean power of a certain number of input values is calculated for determining the power.

* * * * *